United States Patent [19]

Weber et al.

[11] 4,266,124
[45] May 5, 1981

[54] PHOTOELECTRIC OBJECT DETECTOR SYSTEM

[75] Inventors: Daniel R. Weber, Tewksbury; Raymond C. Webb, Foxboro, both of Mass.

[73] Assignee: Data Instruments, Inc., Lexington, Mass.

[21] Appl. No.: 65,512

[22] Filed: Aug. 10, 1979

[51] Int. Cl.³ .............................................. G01V 9/04
[52] U.S. Cl. ..................................... 250/221; 340/556
[58] Field of Search ............... 250/208, 209, 221, 222, 250/578; 340/555, 556, 557

[56] References Cited

U.S. PATENT DOCUMENTS

| | | | |
|---|---|---|---|
| 3,746,863 | 7/1973 | Pronovost | 340/556 |
| 3,805,061 | 4/1974 | De Missimy et al. | 250/209 |
| 3,825,745 | 7/1974 | Thomson | 250/221 |
| 3,970,846 | 7/1976 | Schofield | 340/555 |
| 4,063,085 | 12/1977 | Montanvert | 250/221 |

*Primary Examiner*—David C. Nelms
*Attorney, Agent, or Firm*—Schiller & Pandiscio

[57] ABSTRACT

The invention is an improvement over the system disclosed in U.S. Pat. No. 3,805,061 for detecting intrusion of a selected area by an object and for operating or terminating operation of an associated apparatus when such intrusion occurs. It consists of improved transmitter and receiver units. The transmitter comprises a plurality of radiant energy sources that are strobed sequentially and repetitively by a clocked counter. The receiver has a plurality of radiant energy detectors, means for enabling the detectors sequentially and in synchronism with the strobing of the radiant energy sources, dual control relay means for operating or terminating operation of an associated apparatus, and cross coupled control circuits for causing the relay means to change states if a radiant energy detector fails to detect a radiant energy beam while it is enabled. The receiver's control circuits include pulse detection means for determining if the radiant energy detectors produce pulses in response to incident radiant energy beams, and means for accomplishing at least one of the following: (a) deactivating the relay means if a relay driver has a fault, (b) deactivating the relay means if a pair of relay contacts are stuck closed, (c) terminating flow of current to some or all of the solid state components such as counters, switches, etc. of the receiver when a fault occurs in a relay control circuit, and (d) providing visual indications of the state of the relays.

18 Claims, 11 Drawing Figures

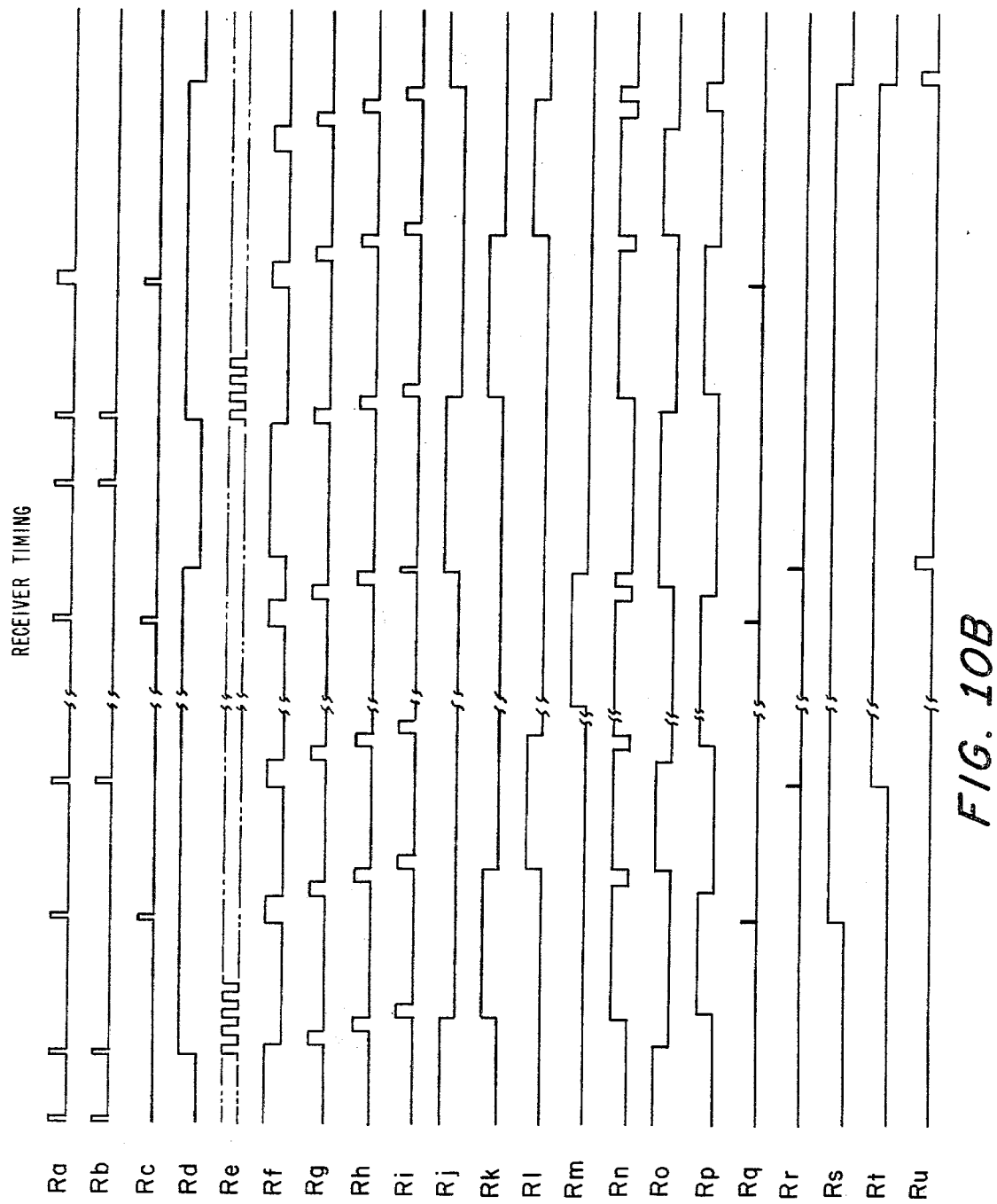

PHOTOELECTRIC OBJECT DETECTOR SYSTEM

This invention relates to photosensitive detection systems for sensing the presence of objects in a predetermined area and more particularly to an improved system for detecting intrusion of an area by an object and for operating or terminating operation of an associated apparatus when such intrusion occurs.

The primary object of this invention is to improve upon the system disclosed in U.S. Pat. No. 3,805,061, issued Apr. 16, 1974 to Phillipe R. Des Rioux De Messimy et al for Object Detecting Apparatus, by providing a system for the same purpose which is less expensive to manufacture and is characterized by more reliable operation.

A more specific operation is to provide an object detecting system which is characterized by novel means calculated to make the system fail-safe as well as highly accurate and reliable for a variety of uses, e.g., as a safety control for dangerous machines such as metal stamping presses, as part of a building security system, or as a control for door or gate actuators.

A further specific-object is to provide a system of the character described which incorporates cross-coupling of parallel circuit components for accuracy and fail-safe reliability, and makes use of multiplexers for cost reduction and system simplification.

The foregoing and other objects made evident hereinafter are achieved by a system which comprises an improved transmitter unit having a plurality of radiant energy sources that are strobed in a predetermined manner and an improved receiver unit having a plurality of radiant energy detector channels that are activated sequentially in synchronism with strobing of the radiant energy sources, with the synchronous operation of the receiver unit being achieved without any direct mechanical or electrical connection between the transmitter and receiver units. The radiant energy sources in the transmitter are strobed repetitively and sequentially by pulses generated by a clocked counter means which is reset and caused to repeat its cycle when the last radiant energy source is pulsed. The receiver comprises pulse detection circuits and fail-safe circuits which are separate but interrelated. The pulse detection circuits include a plurality of solid state radiant energy detectors, one for each radiant energy source, plus demultiplexers which enable the radiant energy detectors sequentially in synchronism with the strobing of the radiant energy sources and cross-coupled gating circuits for causing dual control relay means to drop out if a radiant energy detector fails to produce an output pulse during the time it is enabled. The fail-safe circuits comprise means for deactivating the dual relay means entirely if the driver of one or the other of the two relays is hung up, and preferably also means for monitoring the relay contacts and deactivating one relay if the other relay has a stuck contact.

Other features and many of the advantages of the invention are set forth in the following detailed description and the accompanying drawings in which:

FIGS. 10A and 10B are timing diagrams of the transmitter and receiver modules respectively.

In the several figures of the drawings like characters of reference denote like parts.

Figure 1:
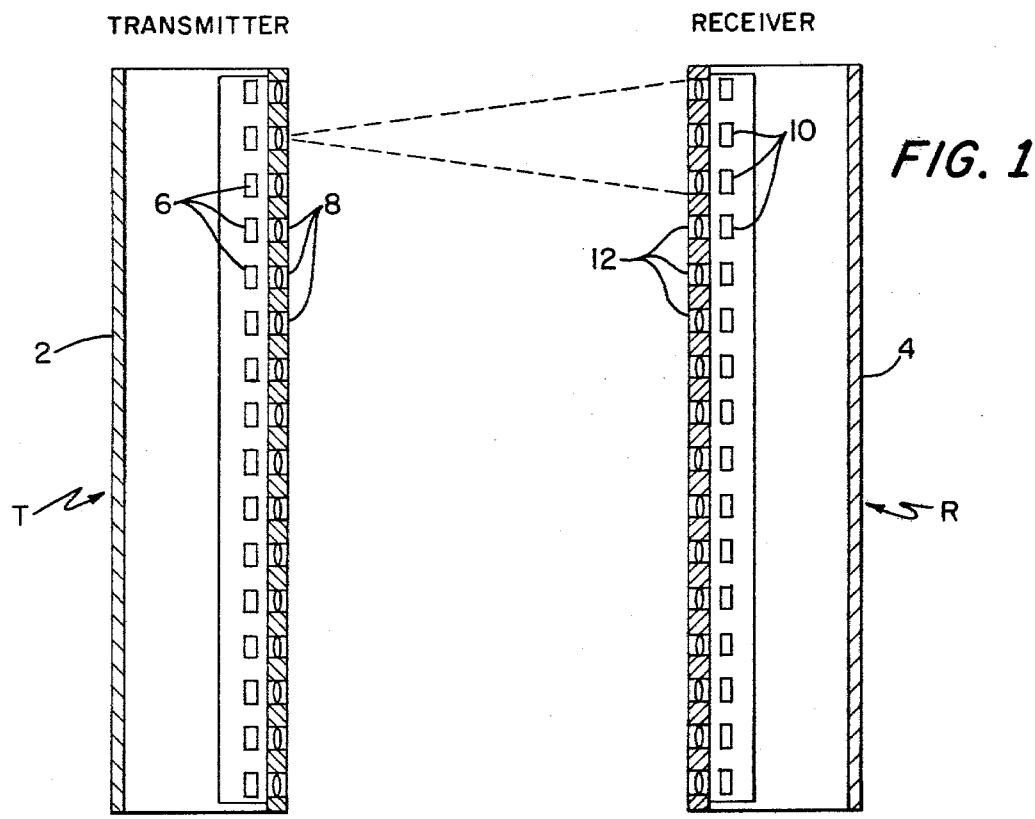
FIG. 1 is a fragmentary sectional view in side elevation showing certain components of a transmitter module and a receiver module.

Referring now to FIG. 1, as in U.S. Pat. No. 3,805,061 the transmitter and receiver units T and R extend vertically and are mounted in spaced relation to each other so as to define and monitor an area or field having a vertical dimension and a horizontal dimension, with the height of the units and the number of radiant energy sources and radiant energy detectors carried by the units varying in accordance with the vertical dimension of the field to be monitored. Of course, the units T and R could be mounted horizontally to monitor a horizontal rather than a vertical field. The transmitter and receiver units are preferably modular in concept, with the transmitter unit consisting of one or more modules each having a predetermined number of radiant energy sources and circuitry for strobing those sources, and each receiver unit consisting of one or more modules each having a corresponding number of radiant energy detectors and strobing circuitry for enabling those detectors in synchronism with the corresponding sources. Where the transmitter and receiver units consist of two or more modules, the modules may be allowed to operate independently or interdependently and synchronously or asynchronously, e.g., the transmitter modules may be connected so that the radiant energy sources of the several modules are strobed in the same sequence and at the same time, or the sources of one module may be strobed at a different frequency than or out of phase with the sources in the other module(s). It also is contemplated that a plurality of transmitter units and a like plurality of receiver units may be combined in tandem where a relatively large field is to be monitored, and the several T or R units also may be interconnected mechanically and/or electrically.

The radiant energy sources and detectors may take various forms, provided that the radiant energy can be directed as a narrow beam and the detectors are capable of responding to such beams under the ambient conditions at the site of the receiver unit. Thus, for example, the radiant energy may be infrared, near-infrared or visible light. Further by way of example, the radiant energy sources may be incandescent tungsten filament lamps, cesium vapor lamps of LEDs. The photodetectors also may take several various forms, e.g., photoconductive, photoresistive or photovoltaic devices, notably photodiodes or phototransistors having a peak sensitivity according to the primary radiation emitted by the light sources.

In the illustrated embodiment, the transmitter and receiver units T and R comprise elongate housings 2 and 4 respectively, with the former containing a single 16-channel transistor module and the latter containing a single 16-channel receiver module. More specifically the transmitter unit comprises sixteen LEDs 6 that generate primarily infrared or near-infrared radiation, plus sixteen identical collimating lenses 8 which are mounted in uniformly spaced apertures in housing 2. Each lens 8 is aligned with a different light source. The receiver unit in housing 4 comprises sixteen photodetectors 10 in the form of phototransistors having a peak sensitivity in the infrared or near-infrared range matched to the primary radiation emitted by light sources 6, plus sixteen identical collecting lenses 12 which are mounted in spaced apertures in housing 4. Each lens 12 is aligned with a different phototransistor. Preferably but not necessarily the light sources 6 are spaced apart by about $\frac{3}{4}$ inch and the phototransistors are arranged with identical spacing.

In the typical installation the transmitter and receiver units are mounted so that light sources 6, lenses 8 and 12, and detectors 10 are located in a common vertical plane with each light source and associated lens being at substantially the same level as the corresponding detector and its associated collecting lens and the optical axis of each lens being substantially horizontal. The transmitter and receiver are spaced apart a suitable distance, e.g., 8 feet, with the axes of the lenses being in substantial alignment with the axes of lenses 10. As with the system of U.S. Pat. No. 3,805,061, it is not necessary for the light produced by light sources 6 to be collimated into a beam that is so narrow as to be capable of illuminating only one detector. Accordingly, a relatively inexpensive collimating lens may be used to direct the light emitted by the light sources to the collecting lenses 12 (relatively inexpensive collecting lenses also may be used since all that is required is that they direct received illumination onto the photosensitive surfaces of the photdetectors). The degree of collimation that is required depends upon the spacing between the receiver and transmitter, the physical spacing of detectors in each module, and the order in which the light sources and signal channels in each module are strobed. By way of example, in the present embodiment, the collimating lenses may be designed so that for a given spacing between the transmitter and receiver housings, e.g. 8 feet, the beam from each light source will be collimated so as to illuminate about six to eight photodetectors.

Figure 2:
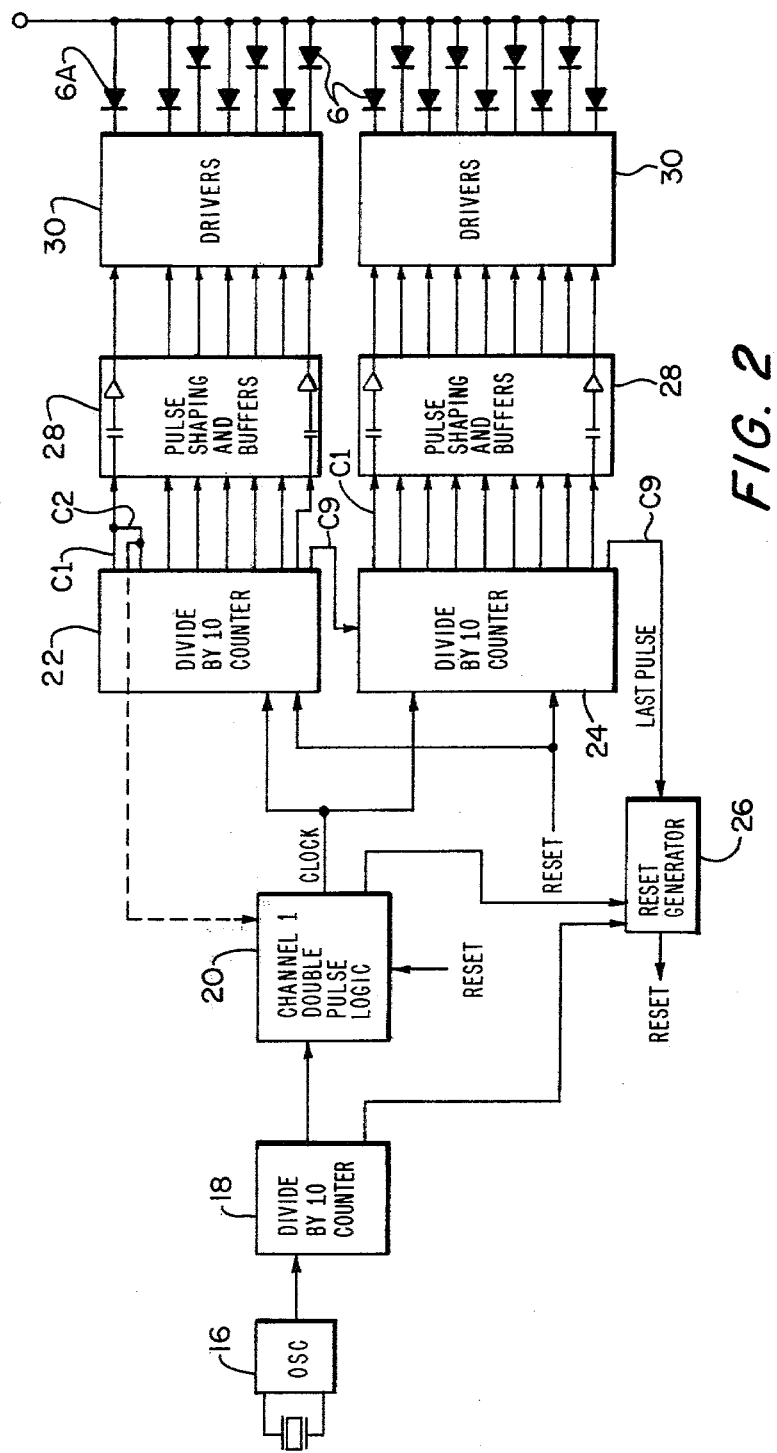
FIG. 2 is a schematic diagram of the electrical system of the transmitter module.

Still referring to FIG. 2, the light sources 6 are energized one at a time in the order in which they are physically arranged even though each beam will illuminate more than one photodetector. However, light sources 6 could be strobed in a predetermined sequence different from the order in which they are physically arranged. Accordingly, and to provide correlation with the receiver unit, the first light source energized in the aforesaid predetermined sequence and the circuitry provided for simultaneously energizing the same are collectively identified as "Channel No. 1." Similarly, the second light source to be energized and the circuitry for simultaneously strobing the same are collectively identified as "Channel No. 2. " The last light source to be energized and the associated energizing circuitry are identified as "Channel No. 16." The corresponding photodetectors 10 in the receiver also are identified according to channel number.

Referring now to FIG. 2, the transmitter unit comprises a clock generator consisting of a 100 kHz oscillator 16 and a frequency divider 18 adapted to divide the output frequency of oscillator 16 by ten so as to produce a 100 microsecond clock signal. Divider 18 is a 10-bit counter. At channel #1 time, this clock is connected unmodified through a double pulse logic circuit 20 to a divide-by-ten, 10-bit counter 22, whereby the counter is clocked to produce two pulses on lines C1 and C2 100 microseconds apart. After these two pulses, the double pulse logic circuit 20 divides the clock frequency by two so that pulses are produced sequentially on the other counter 22 output lines 200 microseconds apart. The pulse produced on the ninth output line C9 of the counter 22 is used to enable a second 10-bit counter 24 which also has the 200 microsecond clock as an input, with the result that commencing with the ninth clock pulse counter 24 will produce output pulses 200 microseconds apart on its output lines commencing with line C1. The pulse on line C9 of counter 24 is used to operate a reset generator 26 whose output is employed to reset counters 22 and 24 and the double pulse logic circuit 20 before occurrence of the eighteenth clock pulse. The pulses produced on the output lines of counters 22 and 24 are applied to the LEDs through individual pulse shaping networks and buffers 28 and LED drivers 30. The pulse shaping networks and buffers 28 and drivers 30 are represented collectively for simplicity and also because they are of conventional design. The output lines C1 and C2 of counter 22 are coupled together so that the pulses occurring thereon are directed to the Channel #1 LED 6A so as to cause the latter to be energized twice 100 microseconds apart, while the pulses on lines C3–C8 of the same counter are used to energize the Channel #2 through Channel #7 LEDs and the pulses on lines C1–C9 of counter 24 are used to energize the LEDs of Channels #8–16 respectively. The cycle of strobing the LEDs repeats automatically after the counters and double pulse logic are reset by the output of generator 26.

Figure 3:
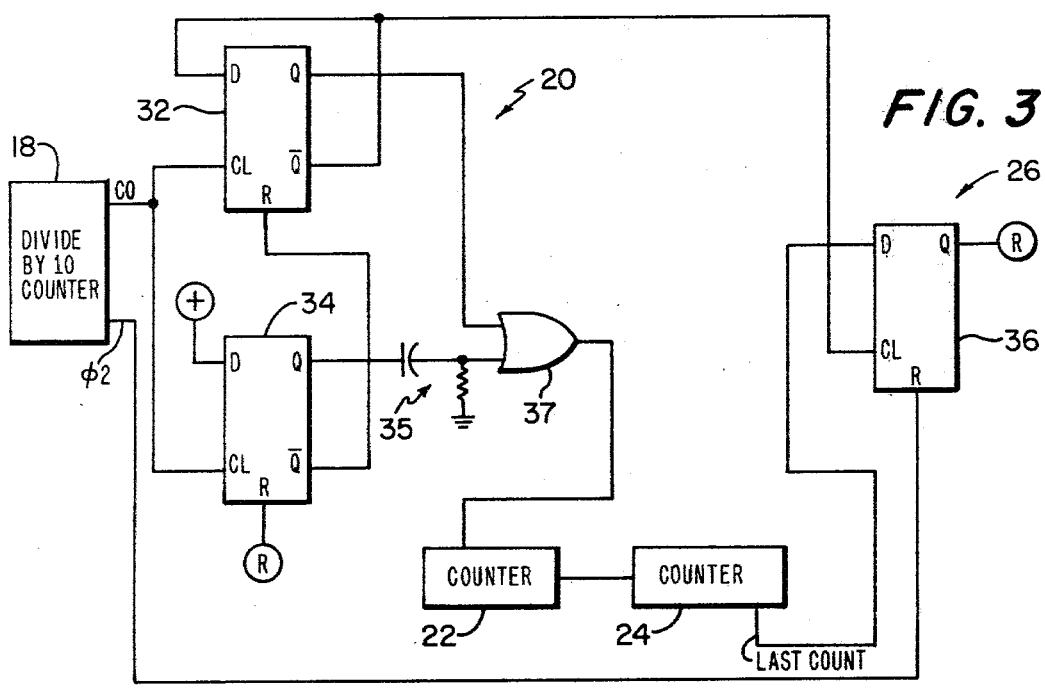
FIG. 3 is more detailed schematic diagrams of the channel #1 double pulse logic.

FIG. 3 illustrates preferred forms of the double pulse logic circuit 20 and reset generator 26, together with counters 22 and 24 and frequency divider 18. The double pulse logic circuit consists of two D-type flip-flops 32 and 34, an RC network 35 and an OR gate 37. The reset generator consists of a third D-type flip-flop 36. The 10 kHz carry-out pulse output of divider 18 (i.e., the $\phi 0$ output) clocks flip-flops 32 and 34. The D (data) terminal of flip-flop 34 is connected to a positive voltage source while the $\overline{Q}$ terminal of flip-flop 32 is connected to its D terminal and also to the clock input terminal of flip-flop 36. The $\overline{Q}$ terminal of flip-flop 34 is connected to the R (reset) terminal of flip-flop 32, while the Q terminals of both flip-flop 32 and 34 are connected to different input terminals of OR gate 37, with the connection of the Q terminal of flip-flop 34 to OR gate 37 being made via RC network 35. The output of OR gate 37 is connected to the CL (clock) terminal of counter 22, while the last count line C9 of counter 24 is connected to the D terminal of flip-flop 36. The $\phi 2$ output of divider 18 is coupled to the reset terminal of reset generator flip-flop 36. The Q terminal of flip-flop 36 is coupled to the R terminals of flip-flop 34 and counters 22 and 24.

The double pulse logic allows the 100 microsecond $\phi 0$ pulse output from divider 18 to pass through OR gate 37 unmodified or divided by two, according to the state of flip-flop 34. At the end of each complete cycle of counter 24 the Q output of flip-flop 36 resets flip-flop 34, and that in turn holds flip-flop 32 reset. Now when $\phi 0$ clock pulses from divider 18 are applied to flip-flops 32 and 34, the first clock pulse after the reset will set the Q terminal of flip-flop 34 high, coupling a pulse through RC network 35 and OR gate 37 to the clock input of counter 22. Since the $\overline{Q}$ output of flip-flop 34 is now low, flip-flop 32 is enabled and consequently the next clock pulse from divider 18 will cause the Q output of flip-flop 32 to go high, causing another clock pulse to pass through OR gate 37 and advance counter 22 one count. Flip-flop 32 is connected as a divide-by-two (i.e. since its D and $\overline{Q}$ terminals are mutually connected, its Q terminal will go high with every other pulse from divider 18 so long as its R input stays low). Hence, in each cycle of the transmitter the output at OR gate 37 consists of two pulses 100 microseconds apart produced from the sequential operation of flip-flops 32 and 34, followed by pulses every 200 microseconds produced by flip-flop 32 until flip-flop 34 is reset by a pulse appearing at the Q terminal of flip-flop 36. At the last count from counter 24, the D input of reset generator flip-flop 36 will be held high. Hence next clock pulse, which occurs 100 microseconds later, will clock a high output to the Q terminal of flip-flop 36, and this high output will reset counter 22 and 24 and flip-flop 34. In the illustrated embodiment the Q terminal of flip-flop 36 stays high for two clock pulses (the phase difference between the $\phi 0$ and $\phi 2$ outputs of divider 18). However, by appropriately selecting another output from divider 18, e.g., its $\phi 4$ output, or by introducing a variable delay in the line connecting divider 18 and the R terminal of flip-flop 36, it is possible to have the Q terminal of flip-flop 36 stay high for a longer period. The net effect of the system of FIGS. 2 and 3 is that in each cycle of operation of the transmitter, LED #1 goes on twice before LED #2 goes on, and LED #2 and the remaining LEDs #3-16 are turned on only once in numerical sequence.

Figure 4:
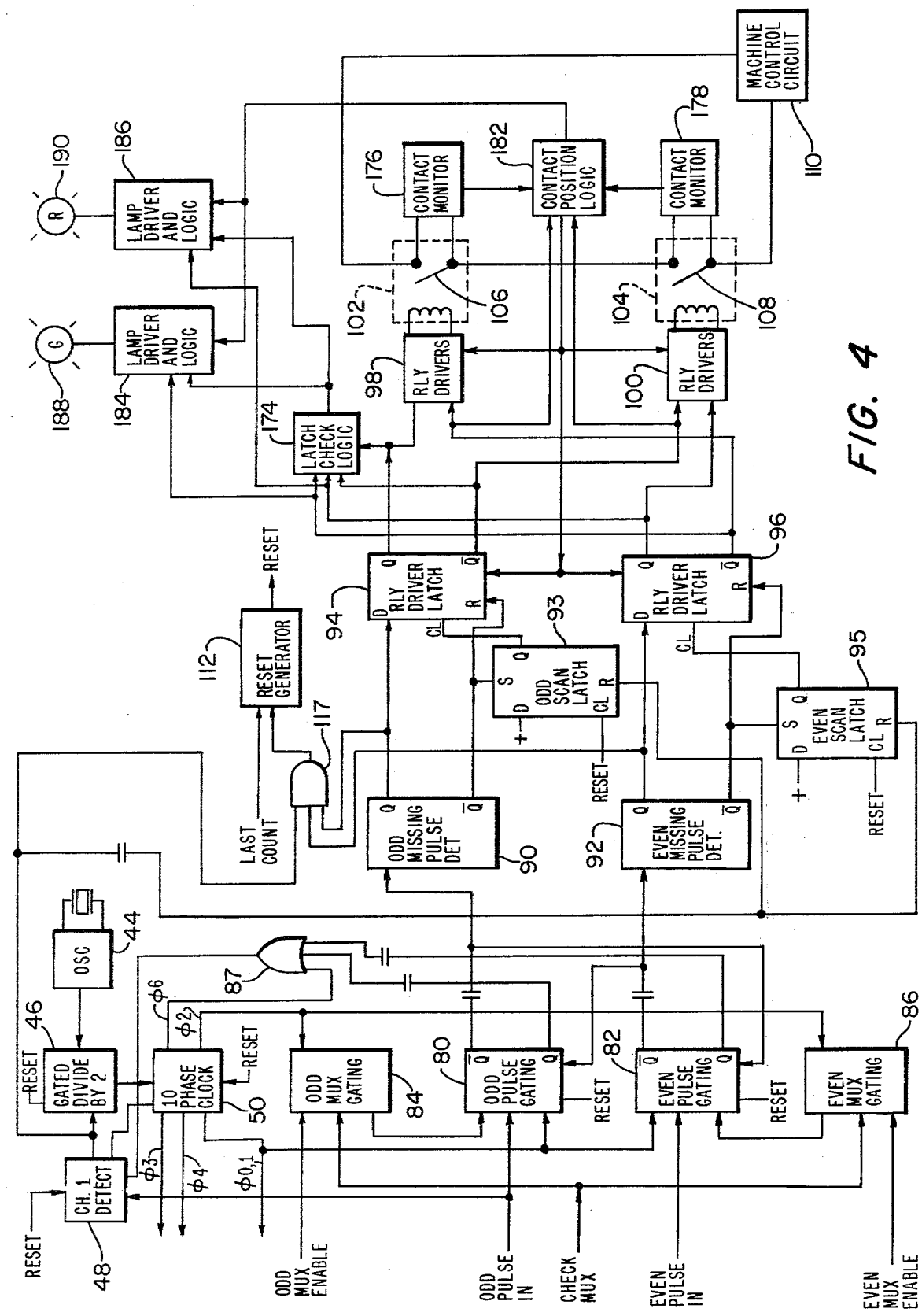
FIG. 4 is a schematic diagram of the fail-safe and control relay circuits and also a portion of the pulse detection circuits of the receiver module.
Figure 5:
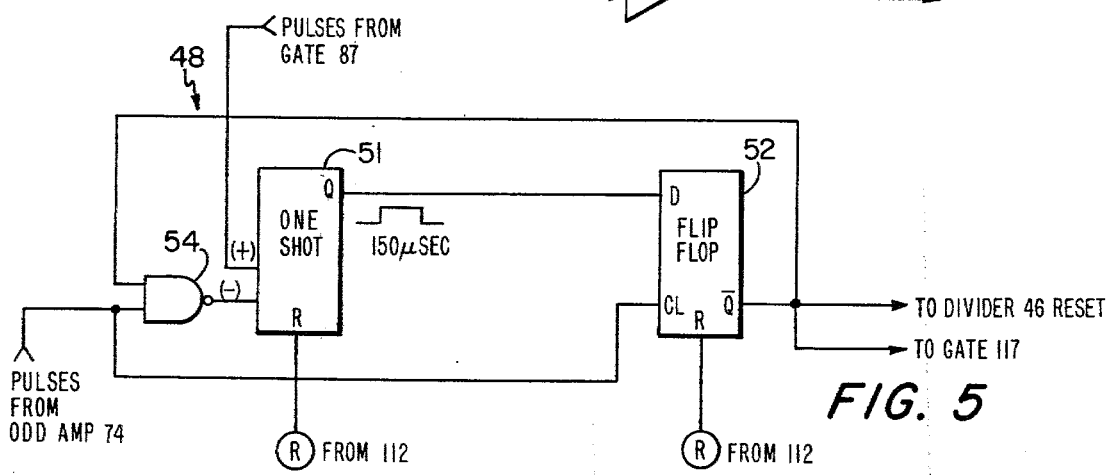
FIG. 5 is a more detailed schematic diagram of the channel #1 detector stage of the receiver module.

Turning now to FIG. 4, the receiver unit comprises a pulse generator in the form of a 100 kHz oscillator 44 and a gated divide-by-two frequency divider 46. The latter is a D type flip-flop which is abled/disabled by a Channel #1 Detector 48. When divider 46 is enabled, it drives a ten-phase clock generator 50 in the form of a divide-by-ten, 10-bit counter whose 5 kHz outputs are labelled $\phi 0$, $\phi 1$, $\phi 2$, etc. in order of occurrence. Only outputs $\phi 0$–$\phi 6$ are used as hereinafter described to clock other stages of the receiver. The Channel #1 detector 48 is operated by a control pulse identified as the "Odd Pulse" which is generated by the pulse detection circuitry of FIG. 6 hereinafter described. The detector 48 is shown in greater detail in FIG. 5 and is seen to comprise a one-shot 51, a D-type flip-flop 52 and a NAND gate 54. The output pulses from an Odd Channel amplifier 74 shown in FIG. 6 (the "Odd Pulses" previously mentioned) are applied to gate 54 and also the clock (CL) terminal of flip-flop 52. The $\overline{Q}$ terminal of flip-flop 52 is connected to the reset terminal of divider 46 and also to input lines of gates 54 and 117 (FIG. 4). The output of one-shot 51 is applied as the D input to flip-flop 52. One-shot 51 and flip-flop 52 have reset terminals which are connected to the output side of a reset generator 112 (FIG. 4). One-shot 51 has two input lines, one of which is connected to the output of NAND gate 54 and is responsive to negative pulses and the other of which is connected to the output of a gate 87 (FIG. 4) and is responsive to positive pulses. One-shot 51 is triggered by the output of NAND gate 54 produced by the leading edge of a positive pulse from Odd Channel amplifier 74 to produce a 150 microsecond positive pulse. After a reset, the $\overline{Q}$ terminal of flip-flop 52 is high and this holds the divider 46 in reset condition. When a pulse from amplifier 74 is received, one-shot 51 will fire and thereby enable flip-flop 52. If the next pulse from amplifier 74 occurs within 150 microseconds, the $\overline{Q}$ output of the flip-flop will go low and thereby enable divider 46, so now the receiver can run and in synchronism with the transmitter. The low $\overline{Q}$ output of flip-flop 52 disables gate 54, preventing subsequent pulses from amplifier 74 from affecting the state of one-shot 51. Divider 46 will continue to operate until flip-flop 52 is reset, whereupon a high on its $\overline{Q}$ output line will reset the divider and hold it off. Operation of one-shot 51 also is controlled by pulses from gate 87 as described hereinafter.

Figure 6:
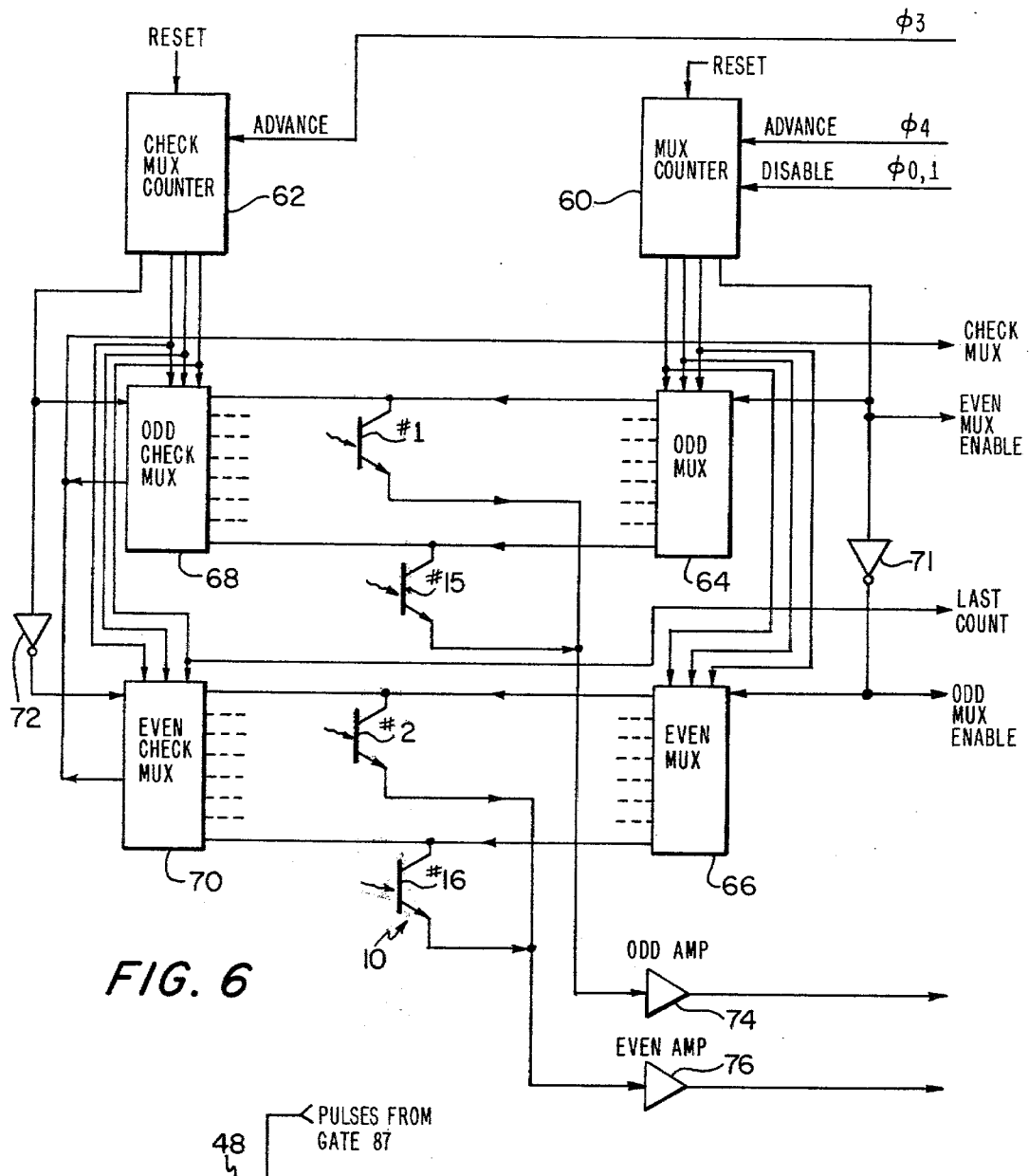
FIG. 6 is a schematic diagram of the remainder of the pulse detection circuits of the receiver module.

Turning now to FIG. 6, the pulse detection circuitry comprises two identical four bit counters identified aes "Mux Counter" 60 and "Check Mux Counter" 62 which drive demultiplexers 64 and 66 and multiplexers 68, 70 respectively.

Counters 60 and 62 are 4-bit binary counters, with their three most significant bit output lines connected to the three input address lines of the multiplexers 64, 66 and multiplexers 68, 70 respectively. The least significant bit output line of counter 60 is connected directly to the inhibit line of demultiplexer 64 and by an inverter 71 to the inhibit line of demultiplexer 66, whereby the multiplexers 64 and 66 will be inhibited alternately on even and odd counts respectively. The least significant bit output line of counter 62 is connected directly to the disable line of multiplexer 68 and by an inverter 72 to the disable line of multiplexer 70, whereby multiplexer 68 is disabled on each even count and multiplexer 70 is disabled on each odd count. Counter 60 is clocked by the $\phi 4$ output of clock generator 50 and is disabled by the $\phi 0$ and $\phi 1$ outputs of the same generator. Counter 62 is clocked by the $\phi 3$ output of generator 50. Each of the demultiplexers 64 and 66 has eight output lines on each of which pulses are produced at a frequency of 5 kHz in response to counter 60 when the latter is clocked by the $\phi 4$ pulses. The eight output lines of demultiplexer 64 are connected to the collectors of the phototransistors 10 of Channel Nos. 1, 3, 5, 7, 9, 11 and 13, while those of demultiplexer 66 are similarly connected to the phototransistors of the even numbered channels. For convenience only the phototransistors of Channels #1, 2, 15 and 16 are illustrated in FIG. 6. All of the emitters of the odd channel phototransistors are connected to a common odd channel amplifier 74 and the even channel phototransistors have their emitters connected to an even channel amplifier 76.

Amplifier 74 and 76 amplify the current pulses of the phototransistors to a logic level pulse required for gating purposes hereinafter described. Demultiplexers 64 and 66 control the collector voltages so that only one phototransistor can be active at any one time. Before the start of a strobing cycle i.e., while clock 50 is off, counter 60 is at zero count, which condition causes demultiplexer 64 to enable the Channel #1 phototransistor, whereupon light pulses from the transmitter unit will cause current pulses to flow through that phototransistor. So long as the double light pulse from the Channel #1 LED does not occur, the Channel #1 detector 48 will disable divider 46, thereby preventing the clock pulse generator 50 from operating and consequently preventing clock pulses from advancing mux counter 60. When the Channel #1 LED double pulse occurs, the double pulse output of amplifier 74 causes detector 48 to enable divider 46, whereupon the ten phase clock generator 50 is turned on to produce clock signals φ0, φ1, etc. Consecutive φ4 pulses at 5 kHz applied to mux counter 60 cause demultiplexers 64 and 66 to enable the phototransistors 10 for Channels #2-16 in consecutive order, i.e., in the order corresponding to the order in which the corresponding LEDs are strobed, whereby pulses are produced by amplifiers 74 and 76 during odd channel and even channel pulse times which occur alternately.

These odd and even pulses from amplifiers 74 and 76 are applied to odd and even pulse gating flip-flops 80 and 82 respectively which are enabled by the φ0 and φ1 clock pulses and the outputs of odd and even multiplexer gating circuits 84 and 86 respectively. The latter are enabled by odd and even mux enable signals from mux counter 60 and are clocked by a "check mux" control signal produced by a multiplexer checking circuitry consisting of check mux counter 62 and multiplexers 68 and 70. The latter have eight data input lines which are tied to the corresponding output lines of demultiplexers 64 and 66 and are configured so that each will produce a "check mux" pulse on its output line whenever a given one of its eight data input lines in enabled at the same time that the corresponding and connected output line of demultiplexer 64 or 66 respectively is high. The check mux counter 62 is also at zero count when the clock generator 50 is off. Hence during φ0 and φ1 time of clock 50, multiplexer 68 has the same setting as demultiplexer 62, whereby the check mux output line is high and enables the odd and even mux gating circuits 84 and 86. On φ3 counter 62 is advanced one count to advance multiplexer 70 so that its Channel #2 input line is enabled. Thereafter counter 60 advances one count on the φ4 signal, at which point counters 60 and 62 will have the same count and the check mux signal pulse is produced by multiplexer 70 to again enable gating circuits 84 and 86.

The pulse gating circuits 80 and 82 are enabled only during φ0 and φ1 by the ten phase clock and hence any switching transients that couple from the demultiplexers 64 and 66 through the phototransistors during φ4 will be ignored. The mux gating circuits 84 and 86 are enabled by the odd and even mux enable signals but only if they are clocked by the check mux signals which are generated at a 5 kHz frequency at the input and output of inverter 71. Hence odd pulse gating circuit 84 is enabled only during odd pulse times and the even pulse gating circuit 86 is enabled only during even pulse times. The amplified phototransistor odd and even pulses must arrive during φ0 and φ1 time to operate the appropriate pulse gating. Pulses that meet this requirement are coupled by gating 80 or 82 to missing pulse detectors 90 or 92 which control relay driver latches 94 and 96 respectively. Detectors 90 and 92 are retriggerable one-shots configured to require input pulses to occur every 500 microseconds (the longest time between two consecutive odd pulses or two consecutive even pulses) in order to remain on. If the input pulses do not occur every 500 microseconds, the outputs of the missing pulse detectors will change (i.e. they will reset), whereupon they will cause the relay driver latches 94 and 96 to be reset and scan latches 93 and 95 to be set. Latches 94 and 96 are D-type flip-flops which are coupled to and provide on/off control for relay drivers 98 and 100 that drive relays 102 and 104 respectively. Scan latches 93 and 95 are described hereinafter.

The relays have normally open contacts 106 and 108 which are connected in series with a load such as a machine control circuit 110 which is to be controlled. During normal operation, i.e., so long as a missing phototransistor pulse or other error is not detected, the relays are both energized so that their contacts are closed. However, the resetting action of latches 94 and 96 will remove the inputs to relay drivers 98 and 100, dropping out the relays.

The Q outputs of missing pulse detectors 90 and 92 and the output of Channel #1 detector 48 are connected to reset generator 112 through an AND gate 117.

As seen in FIGS. 4 and 6, the reset pulse output of generator 112 is coupled to the counters 60 and 62, the Channel #1 detector 48, ten-phase clock 50, odd and even pulse gating circuits 80 and 82, and relay driver latches 94 and 96. If a beam is blocked, both missing pulse detectors 90 and 92 drop out and the one-shot disables the ten phase clock 50, helping insure that both missing pulse detectors drop out. When the reset signal is applied to Channel #1 detector 48, the receiver is returned to the reset state during which it looks again for Channel #1. In the event phototransistor pulses do occur duringg φ0 or φ1 time, the check mux counter 62 will continue to be advanced by each φ3 clock signal until all of the phototransistors have been strobed, in which event counter 62 provides a "last count" signal which is applied to trigger reset generator 106 to thereby return the receiver unit to its reset state during which the Channel #1 detector again looks for Channel #1.

Figure 7:
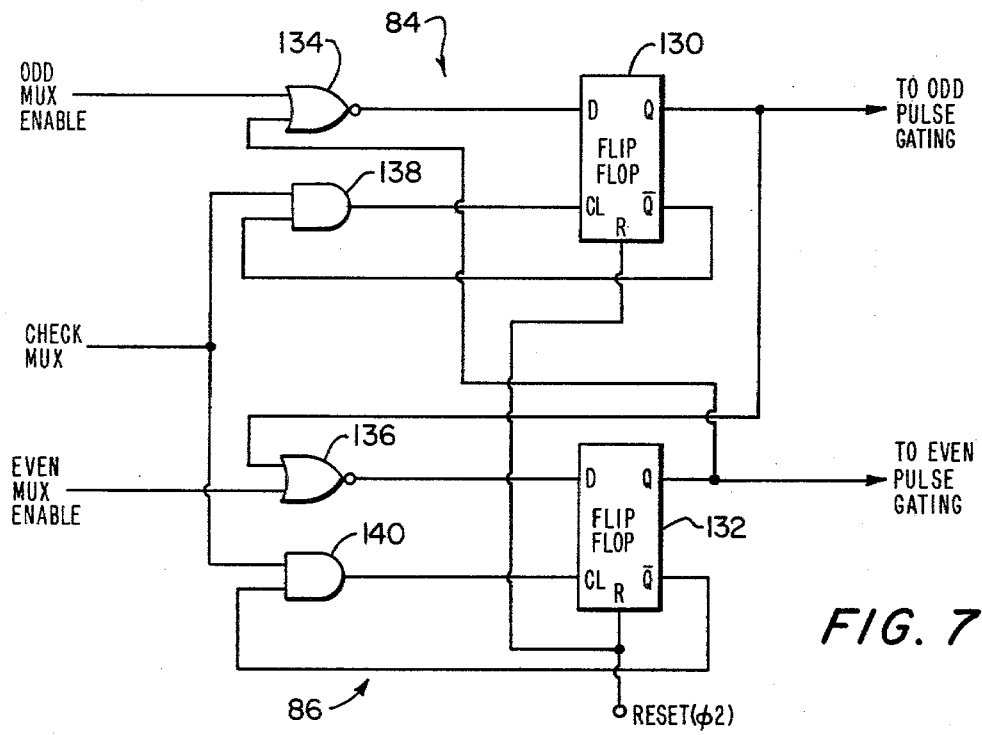
FIGS. 7 and 8 are more detailed schematic diagrams of the mux gating circuits and the odd and even pulse gating circuits.
Figure 8:
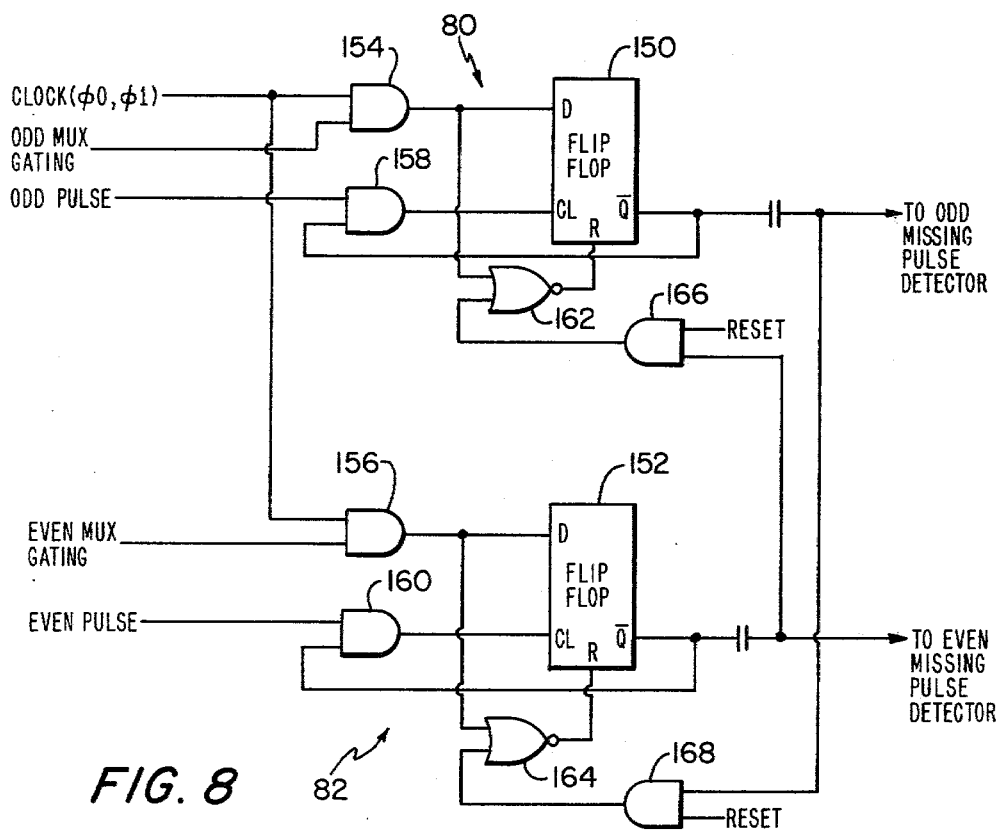

FIGS. 7 and 8 respectively illustrate the odd and even mux gating 84 and 86 and the odd and even pulse gating 80 and 82.

Referring now to FIG. 7, the odd and even mux gating circuit comprises a pair of D flip-flops 130 and 132, NOR gates 134 and 136 coupled to the input terminals of the flip-flops, and two AND gates 138 and 140 coupled to the clock terminals of the two flip-flops. The odd mux enable signal from the input of invertor 71 is applied as an input to NOR gate 134, while the even mux enable from the output of inverter 71 is applied as an input to NOR gate 136. A second input terminal of NOR gate 134 is coupled to the Q terminal of flip-flop 132, while the output at the Q terminal of flip-flop 130 is coupled as an input to NOR gate 136. The check mux signal is applied as an input to AND gates 138 and 140, while the outputs at the $\overline{Q}$ terminals of flip-flops 130 and 132 are coupled as second inputs to the gates 138 and 140 respectively. The φ2 clock signal is applied to the reset terminals of flip-flops 130 and 132. The outputs appearing on the Q terminals of flip-flops 130 and 132, hereinafter identified as the "odd" mux gating and "even" mux gating signals, are applied as gating inputs to the odd and even pulse gating circuits 80 and 82 respectively. The two flip-flops are triggered by the leading edges of the positive going clock pulses supplied by gates 138 and 140. The gates 138 and 140 will allow the check mux signals to clock the flip-flops but only when the $\overline{Q}$ terminals of the flip-flops are high, due to the coupling between $\overline{Q}$ terminals of the flip-flops and the gates 138 and 140. The φ2 signal clears the flip-flops to set their $\overline{Q}$ terminals high in advance of the check mux signal.

The operation of the odd and even mux gating circuit is significant. The φ2 clock signal resets flip-flops 130 and 132 and on the φ3 clock signal the check mux counter 62 advances. If counter 60 is correct and the appropriate mux 64 or 66 is not stuck high, there should now be a low on the check mux signal line. At $\phi4$, mux counter 60 will advance. Since both counters 60 and 62 should now agree, the phototransistor line that is selected by the mux should match the selected line of the corresponding check mux, producing a high on the check mux line. This low-to-high transition clocks a high into the appropriate flip-flop (130 or 132) in the mux gate circuit, which in turn enables the appropriate side of the pulse gating circuit of FIG. 8. If a phototransistor is stuck high, or the two counters 60 and 62 do not agree, the check mux signal will not be generated, with the result that the pulse gate will be disabled and the missing pulse detectors 90 and 92 will drop out.

Turning now to FIG. 8, the odd pulse gating and even pulse gating circuits 80 and 82 comprise two D flip-flops 150 and 152, dual input AND gates 154 and 156 coupled to the D input terminals of the flip-flops, dual input AND gates 158 and 160 coupled to the clock terminals of the flip-flops, dual input NOR gates 162 and 164 coupled to the reset terminals of flip-flops 150 and 152 respectively, and dual input AND gates 166 and 168 connected as hereinafter described.

The two inputs to gate 154 are the $\phi0$ and $\phi1$ clock signals on one input line and the odd mux gating signal on the second input line. The same clock signals are applied as one of the inputs to AND gate 156, while the second input to the same gate is the even mux gating signal. The odd and even light-induced pulse signals from amplifiers 74 and 76 are applied as inputs to the dual input AND gates 158 and 160, while the second input to the same gates is derived from the $\overline{Q}$ terminal of the associated flip-flops 150 and 152. One of the inputs of NOR gate 162 is the output from gate 154, while its second input is derived from gate 166 which is controlled by a first input from the $\overline{Q}$ terminal of flip-flop 152 and a reset signal from reset generator 112. NOR gate 164 has a first input derived from gate 156 and a second input derived from gate 168. The latter has two input terminals, one for application of the reset signal from generator 112, and the other connected to receive the output appearing on the $\overline{Q}$ terminal of flip-flop 150. The outputs appearing on the $\overline{Q}$ terminals of flip-flops 150 and 152 are applied to odd and even missing pulse detectors 90 and 92 respectively.

The odd pulse gating flip-flop 150 is set when the $\phi0$, $\phi1$ clock signals and the odd mux gating pulses are applied simultaneously to AND gate 154, while the other flip-flop 152 is set by the joint application of the same clock pulses and the even mux gating pulses to gate 156. These flip-flops will be toggled by the outputs of gates 158 and 160 only during odd and even pulse times respectively, but only if (1) they have been previously reset so that their $\overline{Q}$ terminals are high and (2) the amplified phototransistor pulses applied as the odd and even pulse signals to gates 158 and 160 respectively arrive during the $\phi0$ and $\phi1$ times in order to clock the respective flip-flops. Toggling of flip-flops 150 or 152 causes their $\overline{Q}$ terminals to go low, thereby producing negative pulses which are applied as an input to the associated missing pulse detectors 90 or 92. It is to be noted that because of the cross-coupling of the outputs of the two flip-flops, flip-flop 152 will be reset only if an odd phototransistor pulse is passed by flip-flop 150. Similarly resetting of flip-flop 150 will occur only if flip-flop 152 produces an even pulse. In other words odd and even pulses must alternately be passed by the flip-flops 150 and 152 in order to reset these flip-flops. A reset pulse also resets these flip-flops, but will occur only at the end of a scan or after a pulse is missed.

In this connection it should be noted that a reset signal is produced by gate 162 only when its two inputs are low. Hence flip-flop 150 cannot be reset during $\phi0$, $\phi1$ time. This protects against the output of gate 154 or 156 getting "stuck" high and allowing mux glitches through. The output of gate 166 goes low when its Reset signal input (the inverse of the Reset signal) is low or the $\overline{Q}$ terminal of flip-flop 152 goes low due to having passed an even phototransistor pulse.

The receiver system shown in FIG. 4 also includes a pulse gate monitor in the form of an OR gate 87. The Q outputs of pulse gates 80 and 82 are capacitively coupled to different inputs of OR gate 87, as is also the $\phi6$ ouput of clock 50. The output terminal of gate 87 is connected to Channel #1 detector 48. The output of gate 87 is a series of pulses produced by the odd and even pulses alternating with $\phi6$ so as to provide a pulse every 100 microseconds, thus keeping output of detector 48 high all the time. The Channel #1 detector 48 output (from flip-flop 52) is connected to disable the 10-phase clock 50 unless one-shot 51 is fired. Operation of the Channel #1 detector when searching for Channel #1 is controlled by monitor gate 87. After Channel #1 occurs, the stream of pulses every 100 microseconds from gate 87 retriggers one-shot 51. If a channel is blocked, there will be a space between the two consecutive $\phi6$ pulses of 200 microseconds, causing the one-shot 51 to time out, disabling the 10-phase clock, firing the reset generator and dropping out the relays via the scan latches 93 and 95 hereinafter described.

Figure 9:
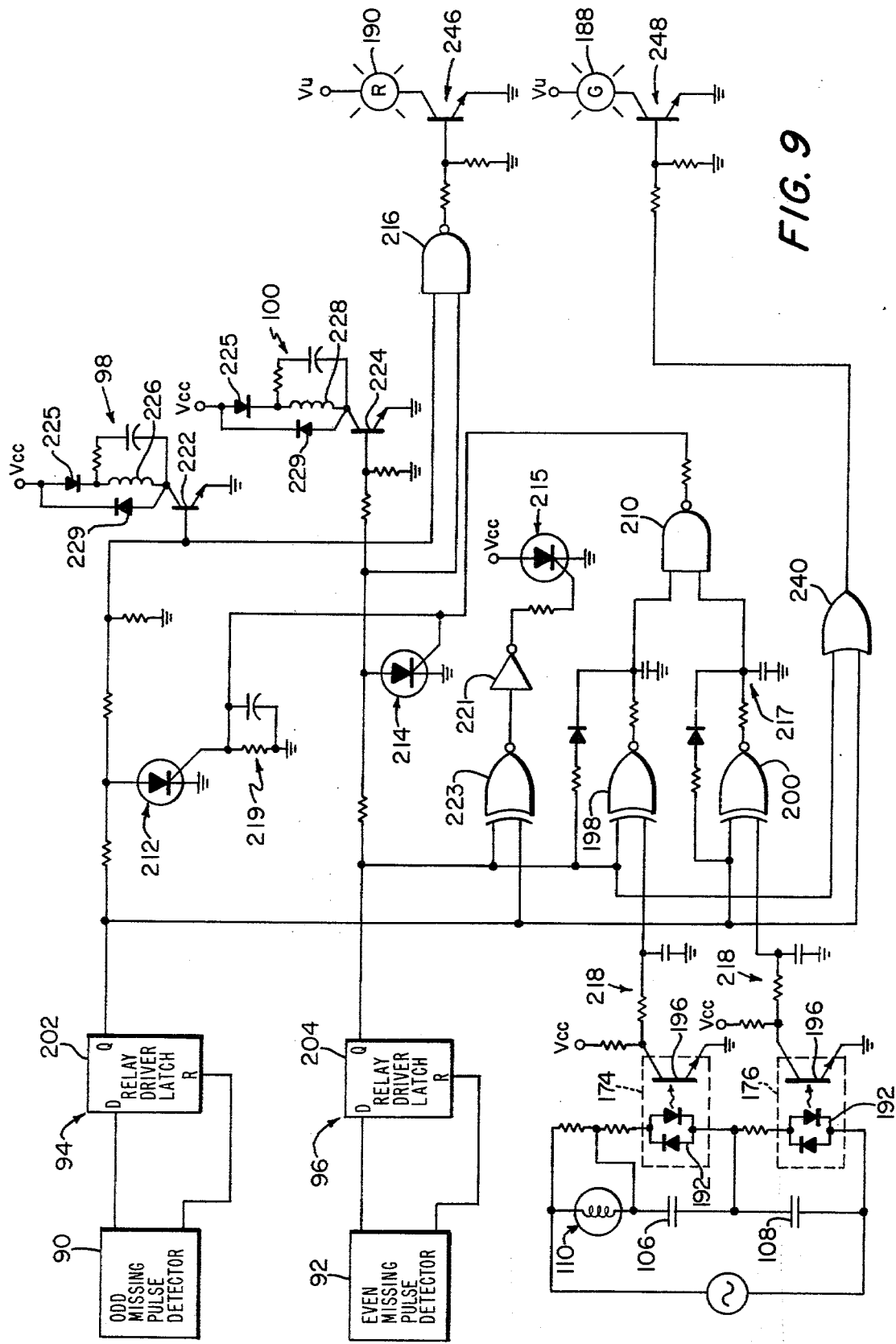
FIG. 9 is a more detailed schematic view of the following stages of the receiver unit: relay driver latches, relay driver latch check logic, contact monitors, contact position logic, lamp drivers, lamp driver logic, relay drivers, and fail-safe power control switches.

Referring now to FIGS. 4 and 9, the system further includes scan latches 93 and 95 for assuring that a complete scan is achieved by the Channel #1 detector before the relays 102 and 104 are energized, plus latch check logic 174, contact monitors 176 and 178, contact position logic 182, lamp driver and logic circuits 184 and 186 and green and red indicator lamps 188 and 190 respectively.

The scan latches 93 and 95 are D-type flip-flops associated with relay driver latches 94 and 96 respectively. Flip-flops 93 and 95 have their Q outputs connected to the clock inputs of latches 94 and 96 respectively, their D terminals connected to positive voltage sources, their reset terminals connected capacitively to the output of the Channel #1 detector, their clock terminals connected to the output line of reset generator 112, and their S (Set) terminals connected to the $\overline{Q}$ outputs of the odd and even missing pulse detectors 90 and 92 respectively. Operation of the scan latches while the Channel #1 detector is scanning for Channel #1 is as follows: at the start of a scan, the Channel #1 detector sets the Q outputs of scan latches 93 and 95 low if the $\overline{Q}$ output of the corresponding missing pulse detector 90 or 92 is also low. At the end of the scan, the reset signal from generator 112 sets the Q output of the scan latches high, strobing a high into the relay driver latches 94 and 96. If a missing pulse detector drops out, the scan latch Q output is set high, strobing a low into the relay driver latch. Therefore, for the relays to stay on or be turned on, the $\overline{Q}$ outputs of the missing pulse detectors must remain low for a complete scan.

Still referring to FIGS. 4 and 9, contact monitors 176 and 178 comprise two opto-isolators (also called opto-couplers), with each isolator comprising a pair of LEDs 192 and a phototransistor 196 connected in parallel with the associated contacts 106 and 108. The latter and the load 110 respectively of the machine or other equipment which is controlled by the system of the present invention, are connected in series with the a.c. power supply for such machine.

The contact position logic 182 comprises two dual input exclusive NOR gates 198 and 200 and a dual input Schmidt trigger NAND gate 210.

The relay driver latches 94 and 96 comprise flip-flops 202 and 204 respectively. The Q and $\overline{Q}$ terminals of the missing pulse detectors 90 and 92 are coupled respectively to the D and R (reset) terminals of flip-flops 202 and 204 respectively.

The receiver further comprises three SCRs 212, 214 and 215 plus a dual input Schmidt trigger NAND gate 216.

OR gate 198 has one input line coupled to the even channels phototransistor 196 via an RC delay circuit represented schematically at 218, while its other input terminal is connected to the Q terminal of flip-flop 204. One of the input terminals of OR gate 200 is connected to the Q terminal of flip-flop 202, while its other input is connected to the odd channels phototransistor 196 via a second RC delay circuit 218. The outputs of gates 198 and 200 are connected to the terminals of NAND gate 210 via additional RC delay circuits 217.

The SCR 212 has its anode connected via a suitable resistance to the Q terminal of flip-flop 202 and its cathode connected to ground, while its gate is held at a suitable level via an RC network 219. SCR 214 has its anode connected via a suitable resistance to the Q terminal of flip-flop 204 and its cathode connected to ground. The gates of SCRs 212 and 214 are connected to respond to the output of gate 210. SCR 215 has its anode connected to a d.c. power supply Vcc and its cathode is grounded, while its gate is connected to the output terminal of an inverter 221. The latter is connected to the output of an exclusive NOR gate 223 having separate input lines connected to the Q terminals of latches 202 and 204. NOR gate 223 and inverter 221 function as the latch check logic 174.

The relay drivers 98 and 100 comprise two switches in the form of transistors 222 and 224. The latter have their collectors connected to d.c. power supply Vcc via the coils 226 and 228 of relays 102 and 104 and a diode 225, while their emitters are grounded. A second diode 229 is shunted across each of the relay coils and the associated diode 225. Also connected across each coil is a suitable series RC network. The base electrodes of transistors 222 and 224 are connected to the Q terminals of latches 202 and 204 via suitable resistors. Additionally the same base electrodes are connected to different input lines of NAND gate 216.

Transistors 222 and 224 function as switches. They are turned on when and so long as their base electrodes are high, and so long as they are on, current will flow through the associated relay coils 226 and 228.

Still referring to FIG. 9, the lamp driver and logic circuits 184 and 186 comprise a Schmidt trigger NAND gate 216 and OR gate 240, which have their outputs connected to control operation of lamp drivers 246 and 248 respectively. The latter are transistors having their collectors connected in series with lamps 188 and 190 and a source of suitable voltage Vu separate from Vcc, their emitters grounded and their bases connected to the output terminals of gates 216 and 240 by a suitable biasing network. Gates 216 and 240 both have two inputs, one connected to the Q teminal of flip-flop 202 and the other connected to the Q terminal of flip-flop 204.

The relay check circuit of FIG. 9 monitors the outputs of the relay driver latches 202 and 204 and the relay contacts 106 and 108 and tests for disagreement between the output states and the relay states.

The Q outputs of the relay driver latches 202 and 204 control the drive transistors 222 and 224 which in turn control the relay coils 226 and 228. A high Q output energizes the associated relay. The contact monitors 174 and 176 are ac operated optical couplers. When the relay contacts 106 and 108 are closed, the voltage across them is zero, and the contact monitor phototransistors 196 are off, producing highs at the corresponding inputs of exclusive NOR gates 198 and 200. These gates therefore have high outputs, keeping the output of Schmidt trigger NAND gate 210 low, and the SCRs 212 and 214 off.

Lows at the Q outputs of latches 202 and 204 turn the relays off, producing lows at the outputs of the contact monitors 174 and 176. With all inputs low to gates 198 and 200, the SCRs 212 and 214 remain off.

If a relay contact welds closed or is bypassed externally, the corresponding contact monitor will have an output that disagrees with the associated latch monitor output, causing gate 198 and 200 to have a low output, firing the SCRs 212 and 214 and latching the relays off. If the latch monitors go high after this (i.e. the obstruction is removed from between the transmitter and receiver) the relays will remain off. Note that both the red and green lights will now be lit, indicating a failsafe condition. If the bypass is removed from the contacts the unit will remain latched. If the beams are now interrupted, the latches 202 and 204 will go low, removing voltage from the anodes of SCRs 212 and 214 and allowing the unit to resume normal operation. This allows the system to detect welded contacts while permitting the user to temporarily bypass the contacts during safe portions of the press stroke.

If either of the odd or even channels fails to produce a light-induced signal on schedule because of one of the missing pulse detectors or a lamp driver or driver latch getting stuck, the output of the corresponding odd or even missing pulse detector 90 or 92 will go low. If the output of the odd or even missing pulse detector goes low, it causes the output of the associated latch flip-flop 202 or 204 to go low while the other will remain high. In such event where the two relay driver latches 202 and 204 disagree, the gate 223 will turn on SCR 215 which crowbars the power supply, shutting off the receiver. At this point everything is off including the two indicator lamps. This shutdown can only be cleared by removing and restoring power. On the other hand, if there is no other fault and either of the odd or even channels fails to produce a light-induced signal on schedule because of a channel beam being blocked, both of the missing pulse detectors will have their outputs go low.

Further with respect to reset generator 112, if a missing pulse detector hangs high after a light beam is blocked, the reset of the receiver will not occur. Since detector 48 has disabled the ten-phase clock, there will be no last count out of the mux counter 60. Therefore no reset will ever occur and the unit will remain off, i.e. relays 226 and 228 will drop out and stay there until sequentially power is removed and restored. This provides additional failure protection.

The various RC networks shown in FIG. 9 are for filtering or time delays to allow the relays to settle and to remove ac from the optical coupler outputs. The capacitors across the relay coils keep the relays turned on during short interruptions caused by strobe lamps on fork lift trucks. The diodes in the relay circuits absorb inductive kick. The diodes around gates 198 and 200 allow the filter capacitors to charge rapidly upon a relay turn-on signal, but to discharge more slowly when the relays are turned off.

Figure 10A:
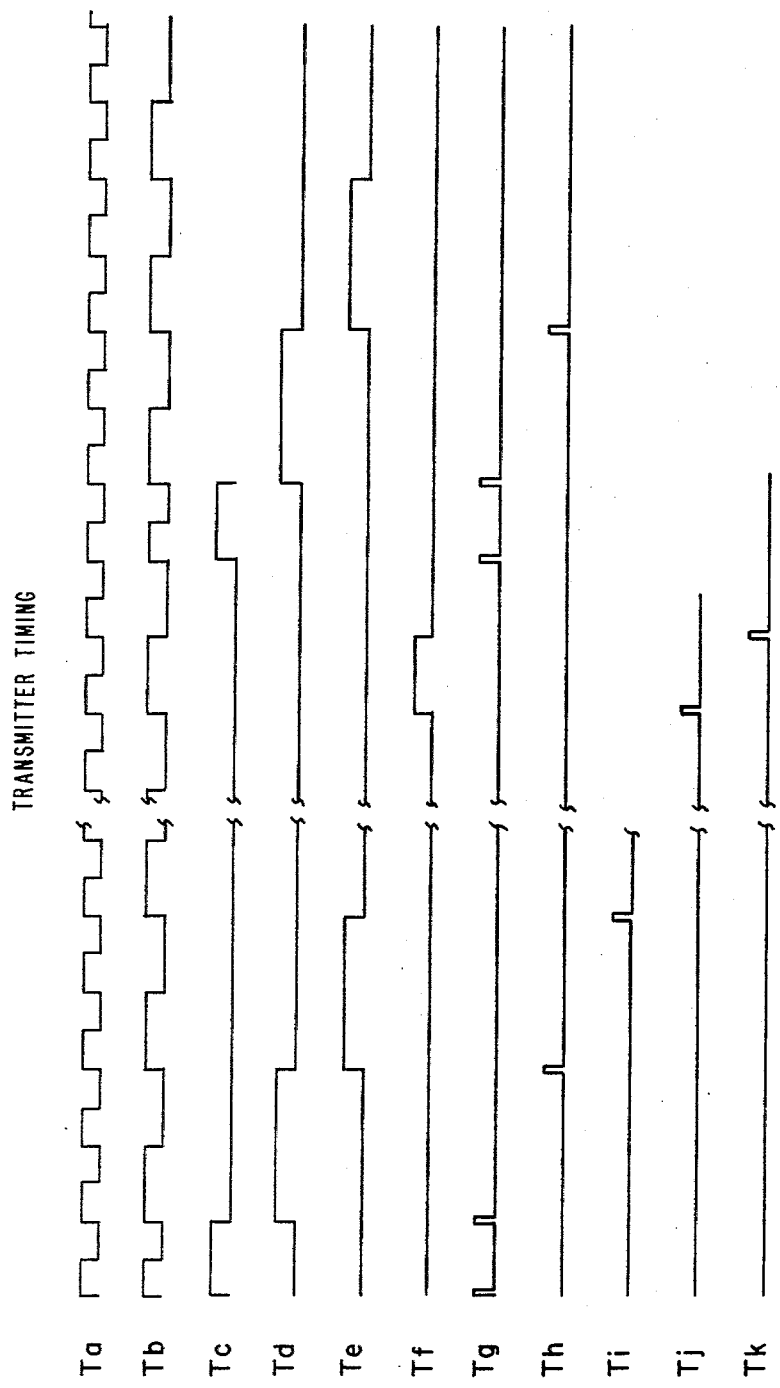

FIGS. 10A and 10B are timing diagrams illustrating the time relationship of selected signals generated in the transmitter and receiver units. In FIG. 10A, Ta is the waveform of the output of divider 18, Tb is the input to counters 22 and 24, Tc and Td are the outputs on the first and second output lines of counter 22, Te and Tf are the outputs on the third and last output lines of counter 22, Tg is the signal input to the LED driver of the first transmitter channel #1, Th, Ti, Tj are the signal outputs to the LED drivers for the second, third and sixteenth channels of the transmitter, and Tk is the transmitter reset signal.

In FIG. 10B, Ra is the waveform of the transmitted light pulses, with the first two pulses representing the double pulses for the #1 Channel, Rb and Rc are the outputs of odd and even amplifiers 74 and 76, Rd is the output of the Channel #1 detector, Re is the output of divider 46, Rf is the waveform for the $\phi0$, $\phi1$ clock signals Rg, Rh and Ri are the $\phi2$, $\phi3$ and $\phi4$ clock signals respectively, Rj and Rl are the signals on the Channel #1 and Channel #3 output lines of odd channel demultiplexer 64, Rk is the output in the Channel #2 output line of demultiplexer 66, Rm is the output on the Channel #16 output line of demultiplexer 64, Rn, Ro and Rp are the check mux, odd mux gate and even mux gate signals respectively, Rg and Rn are the signal inputs to odd and even missing pulse detectors 90 and 92 respectively, Rr and Rt are the output signals of detectors 90 and 92, and Ru is the reset signal produced by generator 112. In FIG. 10b, the waveforms exemplify the normal receiver operation, i.e., when the light beams are uninterrupted and no fault exists in the system.

By way of further summary, if both relay coils are deenergized, the red light will be on and the green light will be off. If both relay coils are energized, the green light only will be on. If only one relay coil is energized, both lights will be turned off. If either relay contacts are bridged or stuck, both lights will be on.

It is to be understood that the number of times the #1 Channel light is turned on and #1 phototransistor is enabled before the corresponding elements of the #2 Channel are activated may vary, as may the number of times each of the other light sources and phototransistors are activated in each sequence. Thus the system may require the #1 channel to be activated three times before the #2 Channel is activated, and each of the #2-#16 Channels may be turned on twice in each sequence.

It is to be appreciated also that the number of channels in each group of channels and the number of duplicate groups of channels may be varied, as may the order of strobing the channels. Thus for example, each transmitter may consist of three light sources and the associated receiver may have three photodetectors. Other modifications will be obvious to persons skilled in the art. Thus, the transmitter and receiver units may be oriented horizontally or at an inclined angle so as to monitor a horizontal or inclined area.

Although the invention has been described in connection with its use to control operation of a machine, it is to be understood that it may be used for other purposes, e.g. to operate an alarm or visual indicator, actuate a door operating mechanism, or disable an electrical power system. Still other applications will be obvious to persons skilled in the art.

What is claimed is:

1. In an object detecting system for determining when an object intrudes into a given area, said system comprising a transmitter for providing a light barrier that extends along said area and a receiver for detecting when the barrier is encountered by an intruding object, an improved transmitter comprising:

a plurality of light sources each adapted when operated to produce a beam of light that extends along said area with each beam transversing a different selected portion of said area; and strobing means for operating said light sources repetitively in a predetermined sequence;

said strobing means comprising pulse generating means adapted to produce a train of signal pulses, means coupled to said pulse generating means for operating said light sources in said predetermined sequence in response to signal pulses from said pulse generating means, and control means for varying the output of said pulse generating means so that in each full sequence of operation one of said light sources is operated N times in response to signal pulses at a frequency f1 and the remainder of said light sources are operated Y times in response to signal pulses at a frequency f2, where N and Y are integers, N is greater than Y and F2 is less than f1.

2. A system according to claim 1 where N is two and Y is one.

3. A system according to claim 1 wherein said control means coamprises a frequency divider, means for activating said frequency divider after said pulse generating means has generated N signal pulses at frequency f1, and means for deactivating said frequency divider after the last light source in said sequence has been operated Y times at frequency f2.

4. A system according to claim 1 wherein said divider is a divide-by-two divider, and said means for operating said light sources in sequence comprises a divide-by-ten counter having individual output lines coupled to different light sources.

5. A system according to claim 1 wherein said divider is a divide by two divider, and said means for operating said light sources in sequence comprises first and second divide-by-ten counters each having individual output lines coupled to different light sources, and means connecting said two counters so that said second counter commences operation after the first counter terminates operation.

6. A system according to claim 1 including means responsive to said second counter for resetting said first and second counters and for causing said control means to change the output of said pulse generating means from f2 to f1.

7. In an object detecting system for determining when an object intrudes into a given area, said system comprising a transmitter for providing a radiant energy barrier that extends along said area and a receiver for detecting when the barrier is encountered by an intruding object;

said transmitter including a plurality of radiant energy sources each adapted when operated to produce a beam of radiant energy that extends along said area with each beam traversing a different selected portion of said area, and strobing means for operating said radiant energy sources in a predetermined sequence with one of said sources being operated N times before the next source in the sequence is operated, where N is an integer that exceeds the number of times the next source is operated in said sequence; and said receiver comprising a like plurality of signal channels each including a radiant energy detector means, each of said detector means being adapted to receive a different one of said beams after the beam has traversed said area and each of said channels being adapted when enabled to produce an electrical signal as a function of the radiant energy received by the corresponding detector means, enabling means for enabling said channels sequentially and repetitively in the same order and at the same frequency as the order of operation of the sources producing the beams received by the corresponding detector means of said channels, said enabling means comprising switching means adapted to enable said channels sequentially in said same order, a clock, means responsive to the output of a predetermined one of said channels having a detector means adapted to receive the beam from said one source for activating said clock when the detector means of said one channel has received a beam from said one souce N times, means controlled by said clock for operating said switching means so as to enable said channels in the same order and at the same frequency as the corresponding sources, whereby each channel will produce an output signal if a beam is received by its detecting means while it is enabled; relay means, and means for maintaining said relay means in a first state so long as said signal channels produce output signals at the same frequency as said sources are operated and for causing said relay means to change state in the event one of said channels fails to produce an output signal when enabled.

8. In an object detecting system of the type comprising (a) a transmitter with a plurality of radiant energy sources that are operated repetitively in a predetermined sequence so as to produce a time-spaced series of beams that extend along different portions of a predetermined area, and (b) a receiver with a plurality of signal channels having detector means arranged so as to receive different ones of said beams after said beams have traversed said area, means for enabling said channels in the same sequence as the sources producing the beams received by the detector means of said channels, and means for producing an output control signal if a beam is not received by the detector of an enabled channel; an improved receiver comprising:

a series of radiant energy detectors each adapted to produce an output signal in response to a beam of radiant energy but only if said beam is received while the detector is enabled;

means for sequentially enabling said detectors, said enabling means comprising a demultiplexer, control lines connecting the demultiplexer with each detector, driver means for operating said demultiplexer so that said detectors will be enabled in a predetermined sequence via said control lines, and means for resetting said driver means when said demultiplexer has sequentially enabled all of said detectors with a predetermined one of said detectors being enabled when said demultiplexer is in the reset state;

a signal detector arranged to produce a control signal in response to the output signals of said one radiant energy detector;

a resettable clock pulse generator connected to said signal detector and adapted to produce clock pulses at a selected frequency from the time said control signal is received until it is reset;

means for resetting said clock pulse generator when said demultiplexer has sequentially enabled all of said detectors; and means for applying said clock pulses to said demultiplexer driver means.

9. In an object detecting system for determining when an object intrudes into a given area, said system comprising a transmitter for providing a light barrier that extends along said area and a receiver for detecting when the barrier is encountered by an intruding object; the improvement comprising:

a transmitter which includes a plurality of light sources each adapted when operated to produce a beam of light that extends along said area with each beam transversing a different selected portion of said area, and strobing means for operating said light sources repetitively in a predetermined sequence, said strobing means comprising (a) pulse generating means adapted to produce a train of signal pulses, (b) means coupled to said pulse generating means for operating said light sources in said predetermined sequence in response to signal pulses from said pulse generating means, and (c) control means for varying the output of said pulse generating means so that in each full sequence of operation one of said light sources is operated N times in response to signal pulses at a frequency f1 and the remainder of said light sources are operated Y times in response to signal pulses at a frequence f2, where N and Y are integers N is greater than Y and f2 is less than f1; and a receiver which includes a like plurality of signal channels each including a light detector means, each of said detector means being adapted to receive a different one of said beams after the beam has traversed said area and each of said channels being adapted when enabled to produce an electrical signal as a function of the light energy received by the corresponding detector means, enabling means for enabling said channels sequentially and repetitively in the same order and at the same frequency as the order of operation of the sources producing the beams received by the corresponding detector means of said channels, said enabling means comprising switching means adapted to enable said channels sequentially in said same order, a clock, means responsive to the output of a predetermined one of said channels having a detector means adapted to receive the beam from said one source for activating said clock when the detector means of said one channel has received a beam from said one source N times, means controlled by said clock for operating said switching means so as to enable said channels in the same order and at the same frequency as the corresponding sources, whereby each channel will produce an output signal if a beam is received by its detecting means while it is enabled, relay means, and means for maintaining said relay means in a first state so long as said signal channels produce output signals at the same frequency as said sources are operated and for causing said relay means to change state in the event one of said channels fails to produce an output signal when enabled.

10. A system according to claim 9 wherein said relay means comprises first and second relays and first and second drivers for said first and second relays respectively, and said means for maintaining said relay means in said first state comprises first and second means responsive to the outputs of different ones of said channels for causing said first and second drivers to deactivate said relays whenever a signal channel fails to produce an output signal while said signal channel is enabled.

11. For use in an object detecting system of the type comprising a transmitter with a plurality of radiant energy sources that are operated repetitively in a predetermined sequence so as to produce a time-spaced series of beams that extend along different portions of a predetermined area,
an improved receiver comprising:
a series of radiant energy detectors each adapted to produce an output signal in response to a beam of radiant energy but only if said beam is received while the detector is enabled;
means for sequentially enabling said detectors, said enabling means comprising a demultiplexer, control lines connecting the demultiplexer with each detector, driver means for operating said demultiplexer in response to clock pulses so that said detectors will be enabled in a predetermined sequence via said control lines, and means for resetting said driver means when said demultiplexer has sequentially enabled all of said detectors with a predetermined one of said detectors being enabled when said demultiplexer is in the reset state;
a signal detector arranged to produce a control signal in response to the output signals of said one detector;
a resettable clock pulse generator connected to receive the control signal output of said signal detector and adapted to produce clock pulses at a selected frequency from the time said control signal output is received until it is reset;
means for resetting said clock pulse generator when said demultiplexer has sequentially enabled all of said detectors; and
means for applying said clock pulses to said demultiplexer driver means.

12. Apparatus according to claim 11 wherein said receiver comprises first and second groups of parallel signal channels each including one of said radiant energy detectors, said one energy detector being part of one of said first group of channels, and further including first and second means connected to said first and second groups of channels respectively for producing first and second signal pulses at said selected frequency in response to the output signal of detectors in said first and second group of channels respectively, missing pulse detector means coupled to said first and second means for producing a relay control signal when either of said first and second means fails to produce a signal pulse in accordance with selected frequency, relay means, and relay control means coupled to said missing pulse detector means for causing said relay means to change states whenever one of said relay control signals is generated.

13. Apparatus according to claim 12 wherein said relay means includes first and second relays and said relay control means comprises first and second control means connecting said first and second relays respectively to said missing pulse detector means.

14. Apparatus according to claim 13 wherein said missing pulse detector means comprises first and second pulse detectors coupled to said first and second means respectively and further wherein said first and second control means are connected and are responsive to said first and second control means respectively.

15. Apparatus according to claim 13 further including first and second means for monitoring the state of said first and second relays respectively.

16. Apparatus according to claim 15 further including means responsive to said monitoring means for causing said relay means to change states.

17. Apparatus according to claim 16 further including means responsive to said monitoring means for deactivating selected portions of said receiver.

18. Apparatus according to claim 13 further including first and second indicator means for indicating the status of said first and second relays, and means responsive to said missing pulse detector means for selectively operating said first and second indicator means.

* * * * *

UNITED STATES PATENT AND TRADEMARK OFFICE
CERTIFICATE OF CORRECTION

PATENT NO. : 4266124
DATED : May 5, 1981
INVENTOR(S) : Daniel R. Weber et al

It is certified that error appears in the above-identified patent and that said Letters Patent are hereby corrected as shown below:

Claim 1, column 14, line 31, "F2" should be "f2".

Claim 3, column 14, line 36, "coamprises" should be "comprises".

Claim 7, column 15, line 29, "souce" should be "source".

Signed and Sealed this

Twenty-eighth Day of July 1981

[SEAL]

Attest:

GERALD J. MOSSINGHOFF

Attesting Officer

Commissioner of Patents and Trademarks